Figure 1:
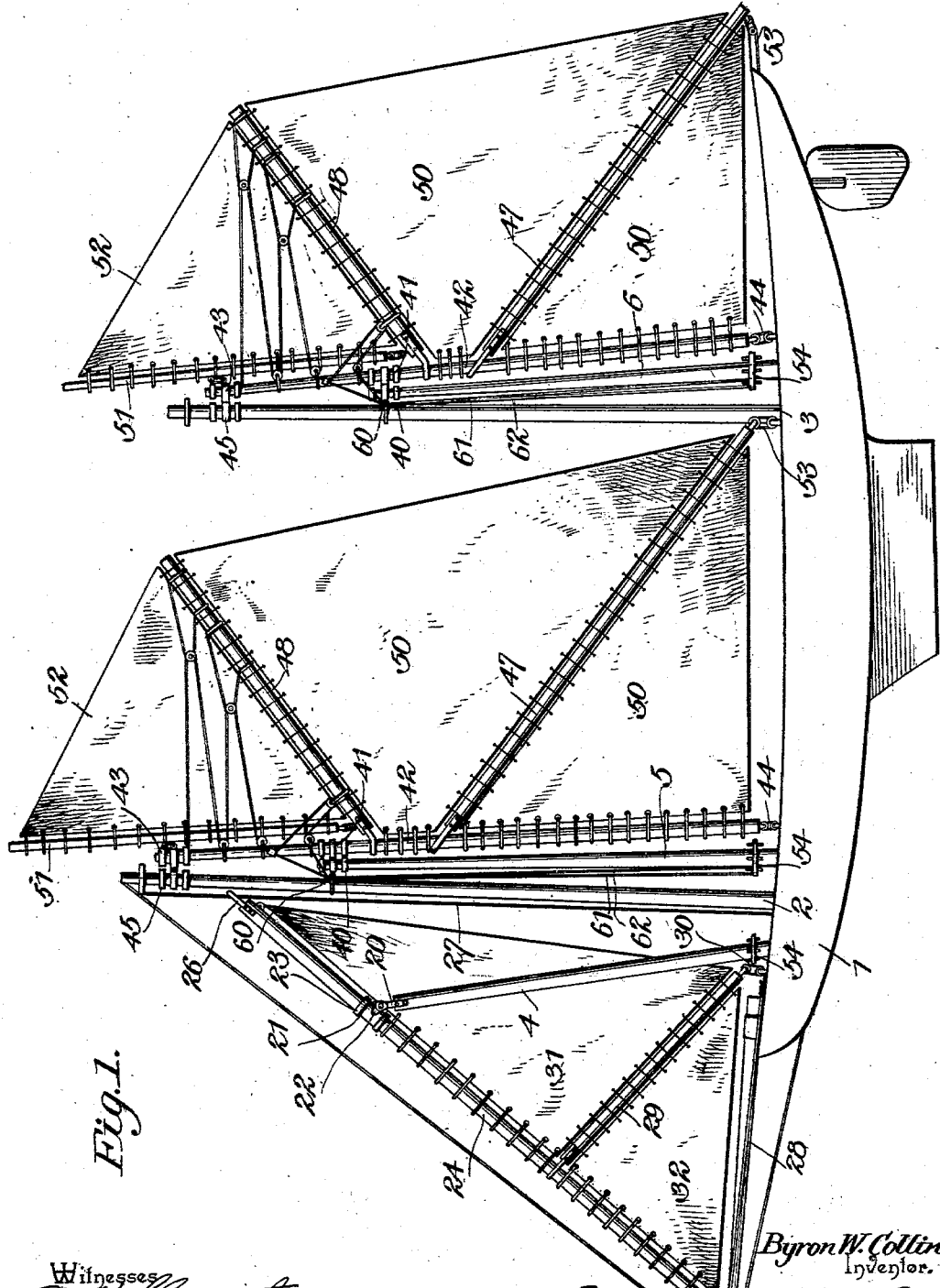

No. 758,171. PATENTED APR. 26, 1904.
B. W. COLLINS.
RIG FOR SAILING VESSELS.
APPLICATION FILED DEC. 19, 1902.
NO MODEL. 4 SHEETS—SHEET 1.

Byron W. Collins,
Inventor.
Witnesses
by
Attorneys

No. 758,171. PATENTED APR. 26, 1904.
B. W. COLLINS.
RIG FOR SAILING VESSELS.
APPLICATION FILED DEC. 19, 1902.
NO MODEL. 4 SHEETS—SHEET 2.

Witnesses
Byron W. Collins, Inventor
Attorneys

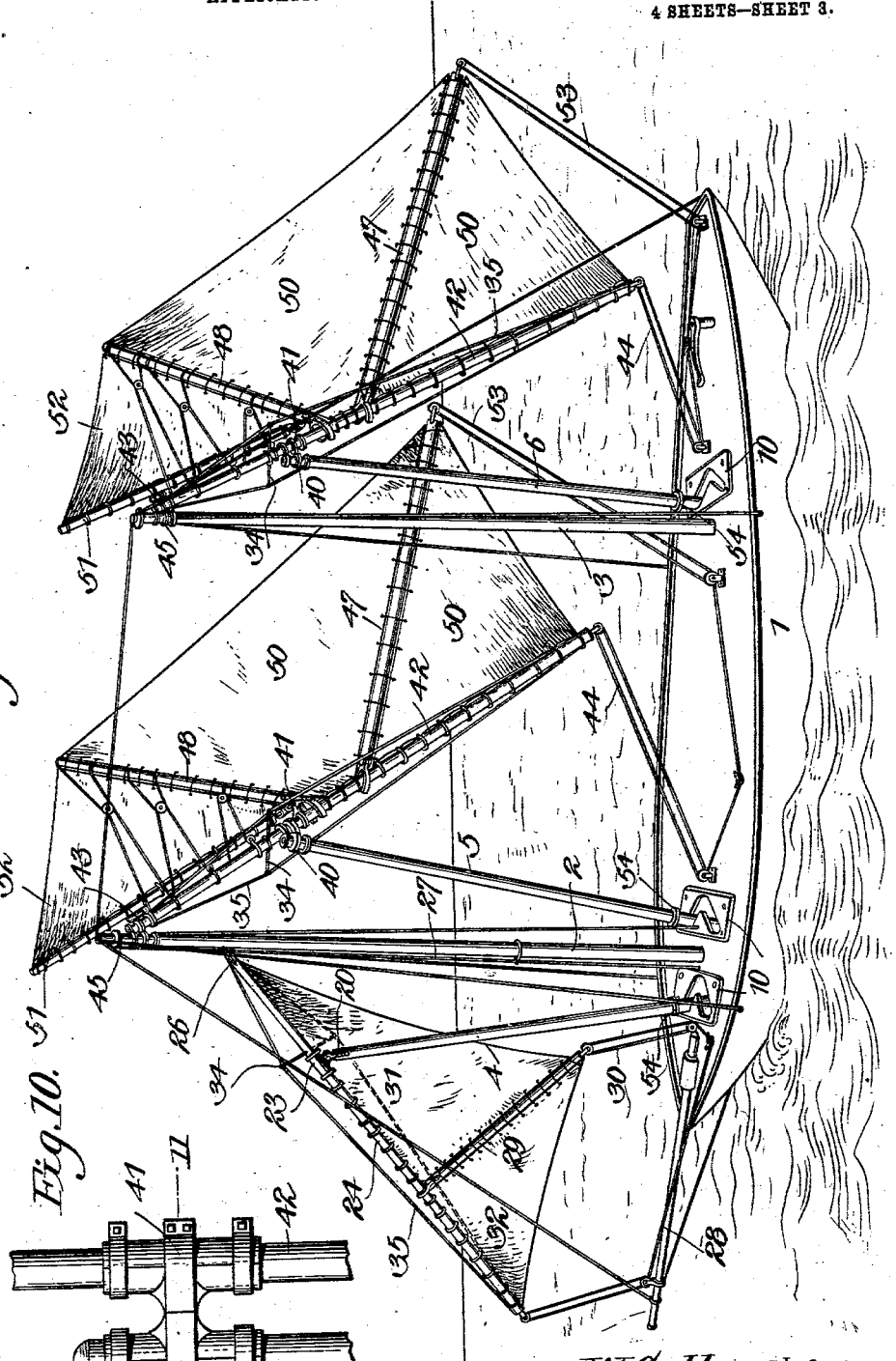

No. 758,171. PATENTED APR. 26, 1904.
B. W. COLLINS.
RIG FOR SAILING VESSELS.
APPLICATION FILED DEC. 19, 1902.
NO MODEL. 4 SHEETS—SHEET 4.
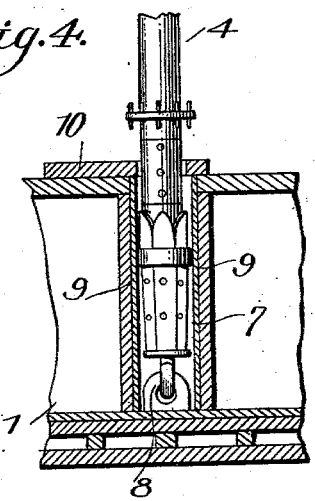
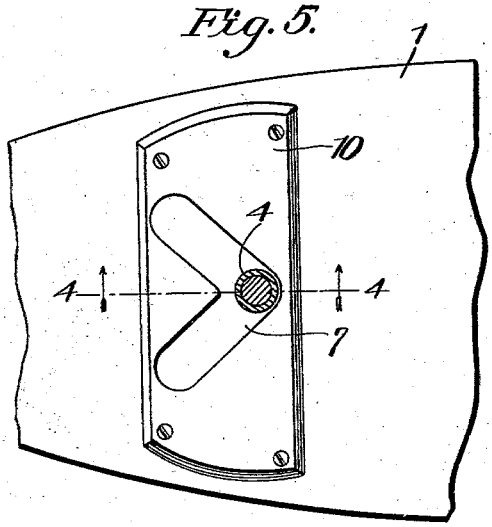
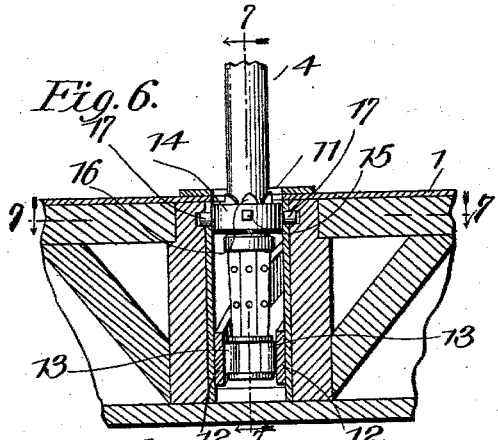
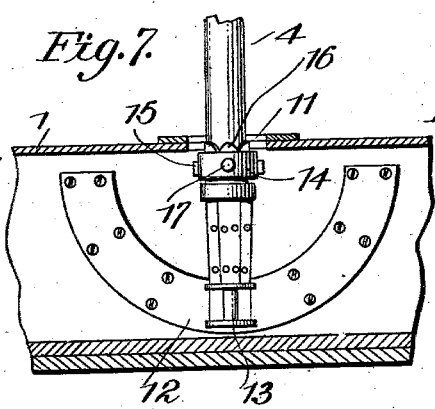
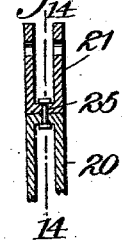
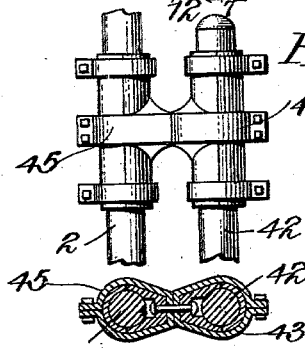
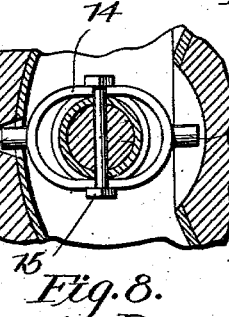
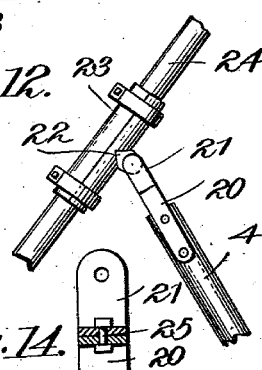
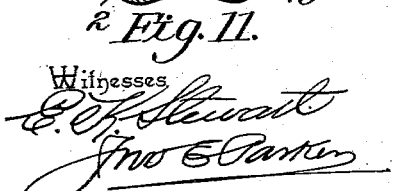
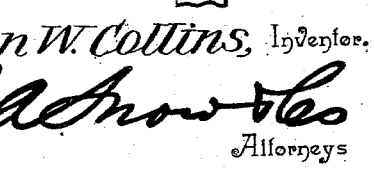
Byron W. Collins, Inventor.
Witnesses No. 758,171. Patented April 26, 1904.

UNITED STATES PATENT OFFICE.

BYRON W. COLLINS, OF EVANSTON, ILLINOIS.

RIG FOR SAILING VESSELS.

SPECIFICATION forming part of Letters Patent No. 758,171, dated April 26, 1904.

Application filed December 19, 1902. Serial No. 135,941. (No model.)

*To all whom it may concern:*

Be it known that I, BYRON W. COLLINS, a citizen of the United States, residing at Evanston, in the county of Cook, State of Illinois, have invented certain Improvements in Rigs for Sailing Vessels, of which the following is a specification.

This invention relates to certain improvements in the rig of sailing vessels, and has for its principal object to provide a rig of such character as to greatly increase the speed of vessels of all character and especially those employed as racing-machines.

The invention relates more especially to sailing-rigs for yachts, and, as is well known, a vessel of this class provided with the ordinary sails accomplishes the best results, particularly in running close on the wind when well listed down upon her side. In this position the sail forms an inclined plane over which as the wind passes it exerts a downward pressure equivalent to a burden of many tons, and this weight, in addition to the weight of the spars, canvas, rigging, &c., applied to long leverage offered by the mast as it inclines far over the lee, tends to capsize the vessel. This downward pressure is greater than the propelling-force exerted on the yacht by the wind, and the limit of sail-carrying capacity is fixed between the force of gravity acting upon the hull, keel, &c., and the aforesaid downward pressure and weight on the lever represented by the mast or masts.

One object of the invention is to overcome this serious difficulty by so arranging the sails that the downward force exerted by the wind will be transformed into an upward pressure, tending to raise the vessel to an even keel and at the same time permit the more favorable action of the wind on the sails and the consequent increase in the propelling force.

A further object of this connection is to so arrange the sail or sails as to permit their swinging out at the bottom until they assume an inclined plane, kite fashion, the wind being forced to pass under the sails, so that the weight of the boom, gaff, canvas, &c., is supported either entirely or in part by the wind.

A still further object of the invention is to so arrange the rig where more than one sail is carried so that one may be employed for the purpose of preventing the pressure mentioned while another can be used in the ordinary way to catch the full lateral pressure of the wind, and thus maintain the equilibrium of the vessel, the two forces—*i. e.*, the lateral pressure and the lifting force—counterbalancing each other.

A still further object of the invention is to permit the application of great increase of sail area to any given yacht in any given wind velocity.

A still further object of the invention is to provide a vessel with a pivotally-mounted sail guiding and supporting lever adjustable toward either side of the yacht in accordance with the conditions under which the yacht is sailing, thereby to permit adjustment of the sails to the direction of the wind and the course of the vessel.

A still further object of the invention is to provide a sailing-rig in which the lifting power exerted by the wind on the sails increases directly in proportion to increase in velocity of the wind—that is to say, when the wind increases while the vessel is running close on the wind on either tack and is listed to leeward the sheets may be eased to allow the sails to extend out farther to leeward, while retaining their relative kite-like position to the wind, and thus by increasing the distance from the vessel increase the leverage force represented by the point of connection of the sails to the mast.

A still further object of the invention is to provide for the adjustment of the sail-guiding lever in lateral direction without danger of interfering with the steering of the vessel and in this connection to provide for the throwing of the lever or levers forward during the movement either to starboard or port.

A still further object of the invention is to provide a sailing-rig of the character described with throat and peak halyards so arranged with respect to the belay-tables or other securing-points at the foot of the masts as to prevent the halyards becoming either taut or slack during any of the adjustment of the masts and sails to accommodate varying conditions.

A still further object of the invention is to provide for increase in the safety of the vessel by so arranging the rigging as to utilize the force of the wind in tending to hold the vessel on an even keel, and thus permit it to ride more lightly in a heavy sea.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
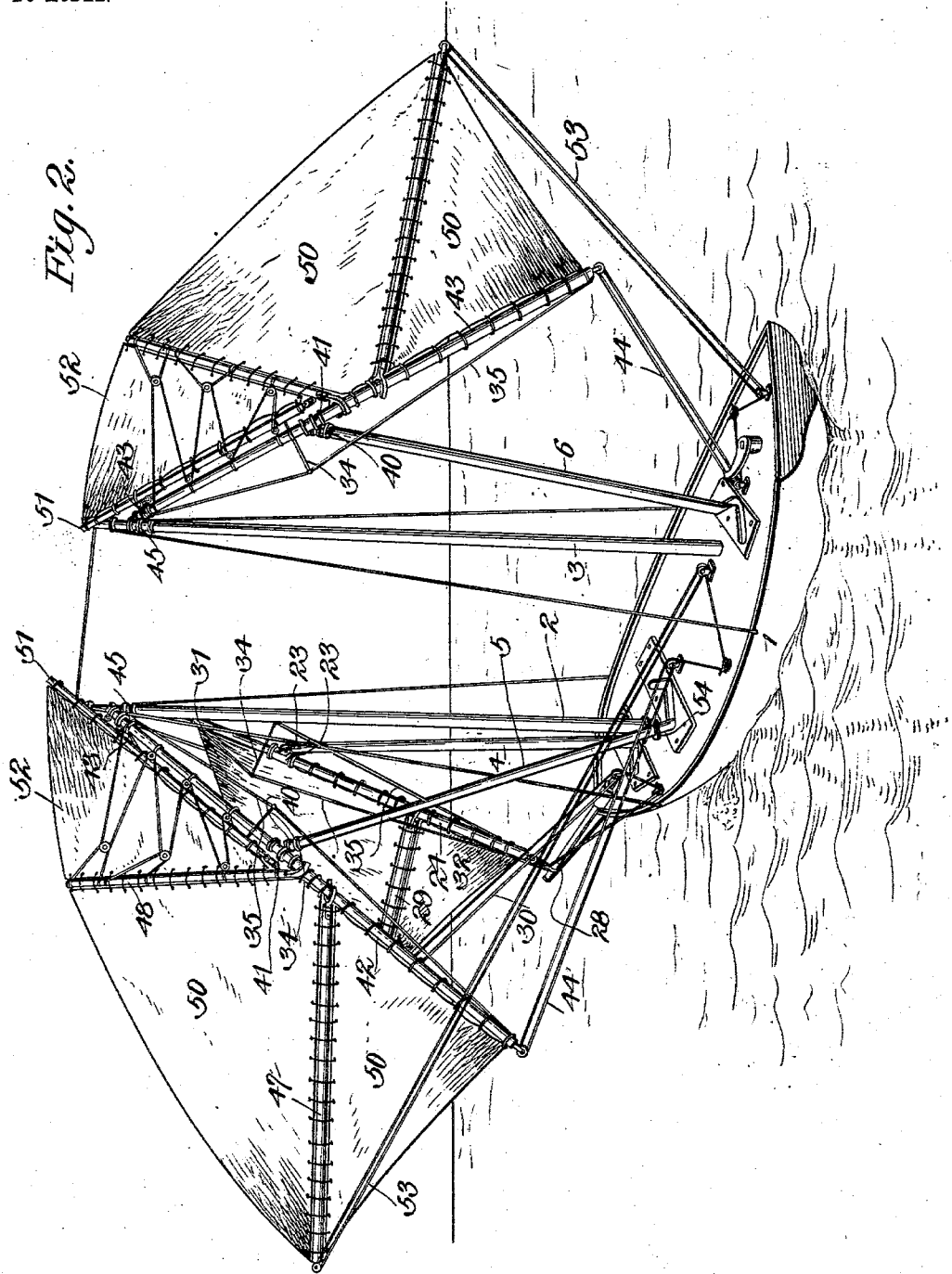

In the accompanying drawings, Figure 1 is a side elevation of a vessel provided with a rig in accordance with the invention. Fig. 2 is a perspective view, partly in the nature of a diagram, showing the rigging adjusted to the position assumed when the vessel is running free before the wind. Fig. 3 is a similar view showing the adjustment of the several parts when the vessel is sailing close to the wind on the starboard tack. Fig. 4 is a vertical section on the line 4 4 of Fig. 5, showing the connection between one of the pivoted sail-guiding levers and the keel of the boat. Fig. 5 is a plan view of a portion of the deck, illustrating the lever in cross-section and a pit in which the said lever is free to swing. Fig. 6 is a view corresponding to Fig. 4, illustrating a slightly-modified construction of the method of supporting the pivoted lever. Fig. 7 is a transverse sectional elevation of the same on the line 7 7 of Fig. 6. Fig. 8 is a sectional plan view of the modified form of lever-support on the line 8 8 of Fig. 6. Fig. 9 is an elevation, drawn to an enlarged scale, of the pivotal connection between the fixed mast and the pivoted lever. Fig. 10 is a similar view of the pivotal connection between the pivoted levers and the booms or yards. Fig. 11 is a sectional plan view of the same on the line 11 11 of Fig. 10. Fig. 12 is a detail view of the universal joint between the forward pivoted lever and the staysail-arm. Fig. 13 is a detail sectional elevation of a portion of the same. Fig. 14 is a sectional elevation of a portion of the universal joint on the line 14 14 of Fig. 13.

Similar numerals of reference are employed to indicate corresponding parts throughout the several figures of the drawings.

The hull 1 of the vessel may be of any desired size or of any design and provided with any desired number of ordinary masts, a foremast 2 and mainmast 3 being illustrated in the present case. With each of these masts is associated a pivoted lever for guiding and in part supporting the sails, and in the case of the foremast a second pivoted lever is used for the purpose of carrying the jib or staysail. These pivoted levers ranging from forward to aft are designated by reference-numerals 4, 5, and 6, respectively, and all are of substantially the same construction, being connected in suitable manner to the vessel proper at their lower ends and their upper ends receiving support from the stationary mast with which they are associated.

In connecting the lower end of the pivoted lever to the vessel it is preferred to arrange the pivot connection as low as possible in order to obtain a purchase near the keel of the boat. One form of connection is illustrated in Figs. 4 and 5, wherein the lower end of the lever extends down into a pit 7 of angular form and has a linked connection with the false keel, as illustrated at 8, so that free movement of the lever will be permitted. The pit 7 has two branches arranged substantially at a right angle to each other and leading forward from the point of bifurcation, so that when the lever is thrown either starboard or port it will be pitched forward at an angle corresponding to the extent of movement, so that the steering-balance of the vessel will not be interfered with. This feature of the invention is considered important for the reason that should the lever move outward in a direction at a right angle to the keel there will be a tendency to materially interfere with the steering and give a heavy-weather helm. By allowing the lever to pitch forward this tendency is overcome and the boat may be steered without difficulty. The walls of the pit are provided with a heavy sheathing or lining 9 of any suitable metal, and at the top of the pit a reinforcing-plate 10 is secured to the deck in order to assist in guiding the movements of the lever.

The construction above described is adapted more particularly for use in connection with racing-machines where speed is more desirable than cabin-room; but in lieu of making the connection directly to the keel or false keel the connection of the lever with the boat may be at a point at the deck-line or at a point slightly below or slightly above the deck-line, as illustrated in Figs. 6, 7, and 8. When so constructed, the shape of the pit is changed, and the opening 11 of the deck-line may be made but slightly larger than the lever, while the pit is segmental in form and is provided with suitably-shaped wear-segments 12, forming bearings for antifriction-rollers 13, carried by the lower end of the lever. To the lever is secured a pivot-ring 14 by means of a pivot-bolt 15, which extends through the ring 14, metal plates 16, and the lever proper. The ring is provided with fore-and-aft trunnions 17, adapted to suitable guides or supports on the walls of the pit, one of these being horizontally elongated, as illustrated in Fig. 8, in order to permit twisting movement of the pivoted lever as it swings to one side or to the other and at the same time is inclined forward in the same manner as it is inclined when mounted in the pit shown in Figs. 4 and 5, the difference in contour of the two pits being that in Figs. 4 and 5 the upper end or top of the pit inclines forward, while in the structure shown in Figs. 6, 7, and 8 the bottom of the pit curves or inclines aft.

Secured to the top of the forward end of the lever 4 is one member 20 of a universal joint, the opposite member 21 being pivotally connected to ears 22 on a sleeve 23, carried by a staysail-arm 24, the two members 20 and 21 being approximately U shape in form and their adjacent ends being connected by a pivot-bolt 25 in order to permit freedom of movement of the staysail-arm. The connection with the staysail-arm is at a point intermediate of the length of the latter, and to the upper end of said arm is secured an eye 26, guided by a stay 27, secured to the head of the foremast 2 at one end and at its opposite end being secured to the deck or the foot of the mast. This stay forms a vertical guide for the staysail-arm; but the support may be considered as being formed by the mast proper, inasmuch as the stay is carried by said mast. The lower end of the staysail-arm is connected to the bowsprit by a sheet 28, which is carried inboard to a cleat at the bow of the boat. The staysail-arm carries a boom 29, to the outer or lower end of which is secured a sheet 30, the two sheets 28 and 30 permitting a considerable range of adjustment of the staysail to accommodate varying conditions. The staysail is made preferably in two parts 31 and 32, connected by the usual rings to the staysail-arm and which may be furled on the staysail-boom 29 when not in use.

The staysail-arm is preferably provided with crosstrees 34, over which pass shrouds or stays 35 to stiffen the arm.

To the rear of each of the fixed masts, of which there may be any desired number, is arranged a pivotally-mounted lever, and as the vessel in the present instance is provided with a fixed foremast 2 and fixed mainmast 3 a corresponding number of levers are shown. As the construction of each mast and lever and the sails carried thereby is practically the same, a detailed description of one will be sufficient to a thorough understanding of the present invention.

The pivoted lever 5 carries at its upper end a fixed collar 40, that is pivotally connected to a second collar 41, carried by an arm 42, that forms the main support for the sails, the pivot connection serving to permit the free outward movement of the pivoted lever and sufficient freedom of movement of the arm 42 to permit the required adjustment of the arm and the sails carried thereby. The lower end of this arm is connected to a sheet 44, by which the arm may be held in midship position or allowed to move to either starboard or port, while the upper end of the arm is supported by the mainmast. The connection between the foremast 2 and arm 42 is illustrated more clearly in Fig. 9, wherein the upper end of the arm 42 is provided with a collar 43, pivotally connected to a collar 45, free to revolve or slide on the foremast, and as the upper end of the pivoted lever 5 moves to either starboard or port, the collar 45 will descend to an extent corresponding to the degree of outward movement and to this extent relieve the strain at the top of the mast.

The arm 42 carries a fore-boom 47 and gaff 48, these two in connection with the arm 42 serving as supports for the two-part foresail 50, and the gaff, in connection with an auxiliary arm 51, serves to support a topsail 52. The after end of the boom 47 is connected to a sheet 53.

The sails may be formed in any desired manner, and for convenience in manipulating these each of the pivoted levers is provided with a belay-table 54, these serving to secure the lower ends of the special form of throat and peak halyards used in raising and lowering the top and fore sails.

To the sleeve 40 at a point immediately forward of the pivotal connection with the sleeve 51, is a block 60, through which pass peak-halyards 61 and throat-halyards 62, attached in the usual manner to the gaff, the peak-halyards being secured at one end to the top of the lever and being thence guided through blocks carried by the pivoted arm and the gaff and passing thence through blocks on crosstrees 34, corresponding to those of the staysail-arm. At this point the halyards pass through the block 60 to the belay-table at the foot of the pivoted lever. A similar connection is made at the throat of the gaff, and the throat-halyard also passing through the blocks 60. If the halyards were arranged in the ordinary manner, they would of course pass to the lower end of the pivoted arms 42 and afterward coiled and hung on said arms, the coils swinging to and fro with the arms, and when these are well out from the side of the boat it would be impossible to reach them. By placing the block or blocks 60 at the axial line of the pivotal connection between the pivoted lever and the arm the halyards may be operated in the usual manner and after being secured to the relatively stationary belay-table at the foot of the lever will permit movement of the arm and the sails in any direction without causing the halyards to become either slack or taut, while the lower ends of the halyards will also be at a point convenient in reach.

When sailing before the wind, the arms and pivoted levers are allowed to swing out one to port and the other to starboard, the extent of movement being controlled by the sheets, and as the pivoted arms move outward the sleeves 45 necessarily slide downward on the fixed masts, so that the sail-power is brought nearer to the hull of the vessel.

One of the principal advantages resulting from the lateral adjustment of the fore and main sails is that it allows all of the sails, and especially the forward ones—*i.e.*, jibs, balloon-jibs, &c.—to catch the full force of the wind. These sails, owing to the fact that they swing far out beyond the bows and that they occupy an upwardly-inclined position, exert a considerable lifting force upon the bows. This entire sail area in this advantageous position is entirely lost in the common rig, especially in schooner-rigged vessels, as the fore-and-aft sails when "winged out" form a complete wind-break. Furthermore, the common rig when running before the wind under full sail is in a most helpless position, as there is no way to immediately relieve the strain of a suddenly-increased wind velocity, whereas in the present case the sheets can be paid out until the kite-like sails assume an almost horizontal position, thus allowing the excessive wind-power to pass under them.

When the sails are in kite-like position, as would be the case in a gale, the only inboard canvas is the topsail. When this is taken in, the mainsail being wholly outboard, the lifting leverage will be increased in proportion to the sail area to such an extent that the necessity of still further shortening the sail would not be as frequent as in the common rig.

The sail area presented to the wind can be diminished to a mere line by paying out equally the arm and boom-sheets, allowing the foot of the sails to rise until the sail reaches an almost horizontal position, even though the vessel be well heeled over.

When running close to the wind, the sails are adjusted to the position shown in Fig. 3. When on the starboard tack, and, as previously described, the greater the list to leeward the greater will be the lifting force exerted by the sails on the mast, this being due to increase in the leverage-power represented by the point of connection between the sail and the masts and the mast and hull. As the vessel lists over, even the extreme inboard end of the sail-supporting arm is carried wholly outboard to the extent of the lateral reach of the pivoted lever at the point of connection between the mast and arm, and the lifting or righting power is carried still farther outboard to the extent of the entire reach of the arm.

It will be observed that the construction and mounting of the staysail-arm is practically the same as that of the remaining arms, each having a fore-and-aft connection at the lower end and the upper end having a vertically-slidable support, the support being carried by the fixed gaffs in case of the fore and main sails, while in the staysail the support is carried by a stay, which in turn is supported by the fixed foremast.

It will be observed that a rigging of this character will avoid the retarding of the boat by the dragging of the boom of an ordinary rig in the water when the vessel is sailing under a heavy free wind.

A further advantage incident to the employment of a rig of this character is that when sailing under a beam or close wind, with the sails in kite-like position, the propelling power can be almost instantly reversed and the vessel brought to a sudden stop without changing her course by simply paying out the arm-sheets, so that the throat or front edge of the sails will be higher than the leech.

A still further advantage gained from use of the improved rig is the automatic reduction of the height of the sail as the upper end of the sail-supporting arm descends upon the mast as the foot portion of the sail is allowed to swing outboard. This is equivalent to instantaneous reefing, as the lateral pressure is reduced in height of leverage and diminished in volume. As the sails assume a kite-like position and the wind passes thereunder an increase in wind velocity and corresponding increase in the lifting force exerted by the wind will lower the point of connection between the arms and the fixed masts, and thus to a proportionate extent reduce the height of the lateral pressure. The reduction of the height of the sail in a heavy wind and the application of a large proportion of the wind-pressure as lifting power to raise the vessel will naturally tend to keep the vessel on a more even keel and to reduce the skin resistance of the hull.

The pivoted levers and sail-carrying arms will vary in length in accordance with the size and height of vessels to which they are applied, and the distance which the sail may be adjusted outboard from the vessel will be proportionate with length of such levers and arms.

Having thus described the invention, what is claimed is—

1. A fore-and-aft-rigged vessel having a sail-supporting arm connected to the luff or fore leech of the sail and adjustable to arrange the sail in a plane inclined with respect to the horizontal and outboard from the vessel to thereby permit the wind-pressure to exercise a lifting tendency on the sail.

2. In a sailing vessel, a sail-supporting means adjustable laterally, and means for directing said sail-support forward during lateral movement in either direction.

3. In a sailing vessel, a sail, a sail-supporting means adjustable to permit outboard movement of the foot of the sail, and means for automatically decreasing the height of the sail in proportion to the extent of outboard movement.

4. In a sailing vessel, a sail, a sail-supporting means adjustable to present the sail in the form of a plane inclined to the horizontal, and means for decreasing the height of the sail in proportion to the angle which it assumes.

5. A vessel-propelling means comprising a sail-supporting arm connected to the luff or fore leech of the sail and adjustable to leeward and in the form of a plane inclined upward in a direction opposite to that in which the wind is blowing, substantially as specified.

6. In a sailing vessel, a mast, a sail-carrying arm connected to the mast, and a pivoted sail-guiding lever connected to the arm and adjustable with respect to the mast.

7. In a sailing vessel, a fixed mast and a pivoted sail guiding and supporting lever adjustable both laterally and forwardly with respect to said mast.

8. In a sailing vessel, a fixed mast, and a pivoted sail guiding and supporting lever having its head movable in an angular plane both forwardly and laterally with respect to the mast.

9. In a fore-and-aft-rigged sailing vessel, a sail having its upper portion supported above the hull of the vessel, and means for adjusting the whole of the foot of the sail outboard.

10. In a fore-and-aft-rigged sailing vessel, a mast, a sail the upper portion of which is supported by the mast, and means for adjusting the foot of the sail wholly outboard.

11. In a fore-and-aft-rigged sailing vessel, a sail, and a sail-supporting means having a connection intermediate of the height of the sail and permitting adjustment of the sail at an angle to the horizontal.

12. In a fore-and-aft-rigged sailing vessel, a fixed mast, a sail of which the head is supported by the fixed mast, a pivoted guiding-lever having a connection intermediate of the height of the sail, and sheet connections at both ends of the foot of the sail for regulating the extent of outboard movement of said sail.

13. In a sailing vessel, a fixed mast, a pivoted sail-guiding lever, and a sail-carrying arm pivotally connecting the mast and lever, the connection with the mast being vertically adjustable.

14. In a sailing vessel, a fixed mast, a pivoted sail-guiding lever, a sail-carrying arm, a longitudinally-movable sleeve carried by the mast and pivotally connected to the arm, and a pivotal connection between the arm and the lever.

15. In a sailing vessel, a fixed mast, a pivoted sail-guiding lever, a sail-carrying arm having a pivotal connection with the lever, and a pair of pivotally-connected sleeves one carried by the arm and the other freely adjustable longitudinally of the fixed mast.

16. In a sailing vessel, a mast, a sail-guiding lever, a sail-carrying arm pivoted at a point intermediate of its length to the lever, a boom carried by the arm, and sheets connected to the lower ends of the arm and boom.

17. In a sailing vessel, a fixed mast, a pivoted sail-guiding lever, a sail-carrying arm having a pivotal connnection with the mast, a lever and boom carried by the arm, and sheets connected to both the arm and the boom.

18. In a sailing vessel, a pivoted and freely-movable sail-carrying arm, a boom carried thereby, a gaff also carried by the arm, and halyards having a guiding device in alinement with the pivotal point of the arm.

19. In a sailing vessel, a pivoted sail-carrying arm, a block adjacent to the pivot-point, and halyards guided by said block.

20. In a sailing vessel, a sail-supporting lever, a sail-carrying arm pivotally connected therewith, a block in alinement with the pivot-point, a gaff carried by the arm, and throat and peak halyards connected to the gaff and extending through the block to fastening-points at the foot of the lever.

21. In a sailing vessel, a hull having a pit of which portions are inclined at an angle to both the keel-line and the athwartships plane, and a sail-carrying lever having its foot pivoted within the pit and guided by the walls thereof.

22. In a sailing vessel, a hull having a pit, the walls of which are arranged at an angle both to the line of the keel and the athwartships plane, and a sail-supporting lever pivoted within the pit and guided forward by contact with the walls thereof during lateral adjustment of said lever.

23. In a sailing vessel, a fixed mast, a sail guiding and supporting lever having its foot pivoted adjacent to the foot of the fixed mast, and a sail supported in part by the mast and in part by the lever.

BYRON W. COLLINS.

Witnesses:
JULIUS RUBINSTEIN,
JOSEPH STAAB.